Oct. 1, 1940.  J. M. LARSON  2,216,245
TEMPERATURE CONTROL SYSTEM
Filed Feb. 26, 1937   3 Sheets-Sheet 2

Inventor
John M. Larson
By Amro, Thiess, Olsen & Mecklenburger
Attys.

Oct. 1, 1940.  J. M. LARSON  2,216,245
TEMPERATURE CONTROL SYSTEM
Filed Feb. 26, 1937  3 Sheets-Sheet 3

Fig. 2.

Inventor:
John M. Larson.
By: Anso, Philess, Olson & Mecklenburger
Attys

Patented Oct. 1, 1940

2,216,245

UNITED STATES PATENT OFFICE 2,216,245

TEMPERATURE CONTROL SYSTEM

John M. Larson, Chicago, Ill., assignor to Minneapolis-Honeywell Regulator Company, Minneapolis, Minn., a corporation of Delaware Application February 26, 1937, Serial No. 127,837

16 Claims. (Cl. 236—1)

This invention relates to temperature control systems, and more particularly to temperature control systems for regulating temperature in one or more rooms regardless of variations in outdoor temperature or other conditions which might adversely affect the temperature of the room or rooms.

The invention contemplates a system whereby a plurality of rooms may be controlled in such a manner that a uniform temperature may be maintained in all of the rooms or a different temperature may be maintained in each room in accordance with individual requirements and regardless of variations in outdoor temperature. That is, the invention not only contemplates a control system including a plurality of temperature-responsive devices cooperatively functioning to maintain a predetermined temperature in a single room, but also provides a system whereby each of a plurality of rooms may be maintained at a desired predetermined temperature.

A further object of the invention is the provision of a system of temperature control in which variations in one or more remotely positioned thermostats may vary the effective setting of individual room thermostats in accordance with varying requirements, and simultaneously indicate the new setting.

A further object is the provision of a temperature control system of the character described in which a heating system may be provided for winter use and a cooling system for summer use, and in which a temperature-responsive control is associated therewith, whereby either the heating or cooling device may be brought into operation in accordance with seasonal variations in the outdoor temperature registered by one or more outdoor thermostats.

Another object is the provision of a temperature control system having a circulating system adapted for either heating or cooling in accordance with temperature requirements, and in which the entire system is controlled over a wide range of outdoor temperatures in accordance with indoor requirements.

A further object is the provision of a pneumatic system for variably controlling the heating and cooling mediums in which the pneumatic pressure is controlled by a plurality of thermostats cooperatively functioning under control of different variable temperature conditions to cause the heating and cooling means automatically to function in accordance with extremely wide temperature range requirements. Also, the variable control is automatically switched from cooling to heating, or vice versa, in accordance with requirements, without disturbing the effectiveness of the various control arrangements whereby substantially constant predetermined temperature may be maintained in one or more rooms.

A further object is the provision of a temperature control system of the character described, which will be completely automatic in operation in response to temperature changes and which will be simple in operation, convenient to install, and will not easily get out of order.

Suitable adjustments are provided whereby the temperature-responsive elements, as well as all elements controlled thereby, may function automatically to maintain predetermined temperature in accordance with all normal winter and summer heating and cooling requirements.

It is well known that when extremely high outdoor temperature prevails, it is desirable, in order to prevent physical shock and discomfort in an air cooled room, that the temperature in the room should vary in a predetermined relationship with the variations in the outdoor temperature, that is, it is usually desirable that the room temperature should never be more than from 10 to 15 degrees below the outside temperature, and should vary in a predetermined relationship with the outside temperature.

Also, in winter, or when extremely low outside temperatures prevail, it is desirable to vary the setting of the indoor thermostats in a predetermined relation with the variations in low temperature in order to control the heating medium in a manner to compensate for increased heat loss from cold walls and windows. In some cases there is a considerable difference between the temperature at the room thermostat and the temperature near the walls or at the windows and doors, and automatic variation of the setting of the room thermostat is to compensate for the heat loss due to this difference in temperature.

Further objects will be apparent from the specifications and the appended claims:

Figures 1, 2:
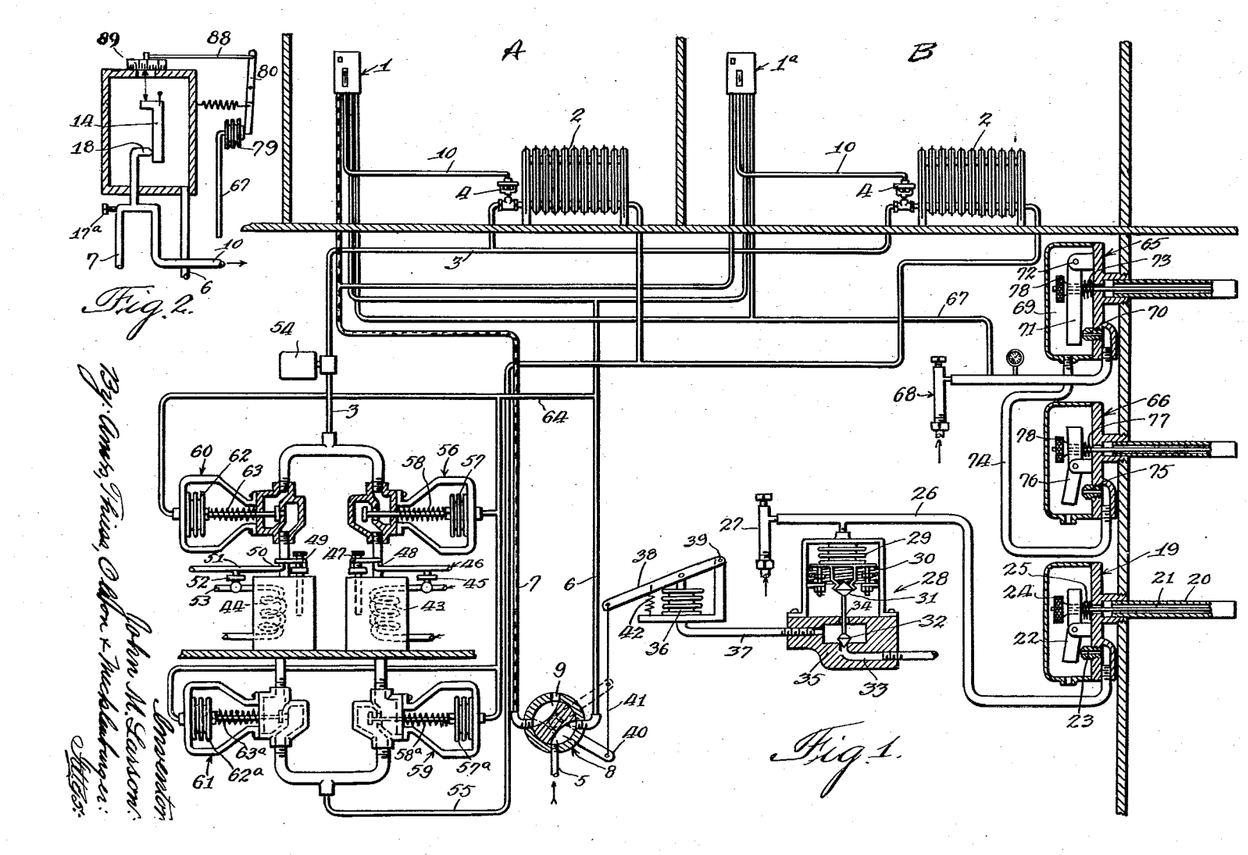
Fig. 1 is a diagrammatic view of one embodiment of the improved temperature control system.
Fig. 2 is a diagrammatic illustration of one of the room thermostats and connections therefor, such as illustrated in Fig. 4.

Referring to the drawings in detail, a complete installation is illustrated in Fig. 1 including the use of room thermostats 1 and 1a. The system is illustrated as installed in connection with the temperature control of only two rooms, A and B. However, it will be understood that any number of rooms may be connected with, and similarly controlled by the system as desired.

In the embodiment illustrated in Fig. 1, each room thermostat, 1 and 1a is arranged to control the delivery of either a heating medium or a cooling medium to its respective heat exchanger or radiator 2, to which the heating or cooling medium may be delivered through a suitable conduit 3. Each heat exchanger is controlled by means of a suitable pressure operated valve 4. These valves are preferably of the usual diaphragm or bellows type in which the valve may be closed by air pressure and opened by means of a suitable spring when the air pressure is released.

In the present embodiment a suitable air pressure may be delivered to the radiator control valves from any suitable source through a pressure main 5 and branch conduits 6 and 7 leading therefrom. The delivery of suitable air pressure to these branch conduits is controlled by means of a four way valve 8. The valve 8 is movable to two positions, as illustrated by the full lines and dotted lines, and in the full line position shown, the main 5 is arranged to deliver pressure to the branch conduit 6 for so-called summer control; that is, whenever high outdoor temperatures prevail and it is desired to control the inlet of a cooling medium to the radiators 2. When the valve is in this position, the branch conduit 7 is connected to atmospheric pressure through an exhaust port 9.

When the valve 8 is moved to the dotted line position, either manually or in response to a predetermined low outdoor temperature, the winter control branch conduit 7 will be connected to receive pressure from the pressure main 5 to control the inlet of heating medium to the radiator, and simultaneously the branch conduit 6, or so-called summer control conduit, will be connected to atmospheric pressure through the exhaust port 9. These branch conduits 6 and 7 are further controlled, by means of the thermostat 1, to deliver operating pressure through a conduit 10 leading to the radiator valve 4 from either of the branch conduits 6 or 7 in accordance with room temperature requirements; that is, during summer, or when high temperatures prevail, the thermostat 1 may direct pressure from the branch conduit 6 through the valve conduit 10 to control the valve 4; and during winter, or low temperatures, the thermostat 1 may direct pressure from the branch conduit 7 through the valve conduit 10 to control the valve 4.

Figures 3, 4:
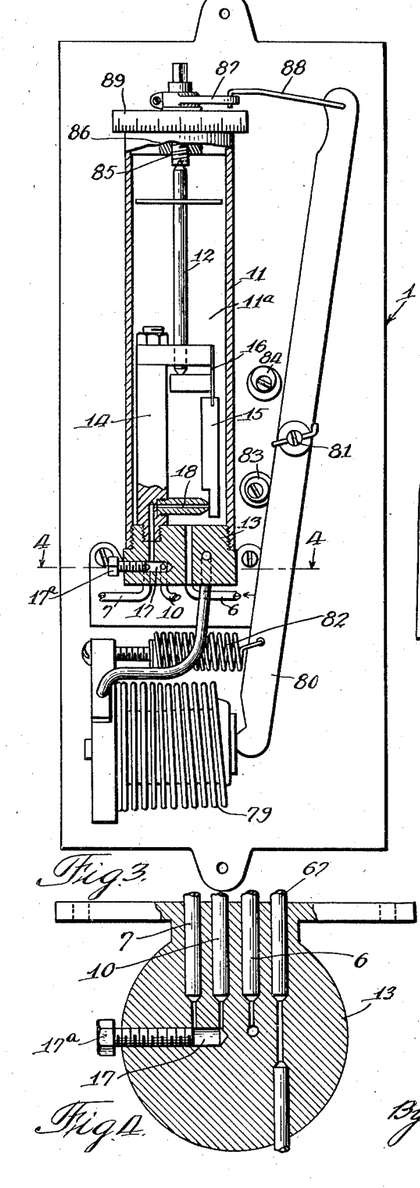
Fig. 3 is a vertical sectional view of one of the room thermostats illustrated in Fig. 1.
Fig. 4 is a transverse sectional view through the base of the thermostat and taken on a line substantially corresponding to line 4—4 of Fig. 3.

The room thermostat 1 is illustrated in detail in Fig. 3, and the conduit connections therefor are illustrated diagrammatically in Fig. 2.

All of the room thermostats may, of course, be identical in structure and operation if desired, but may be adjusted for effective operation over different temperature ranges, and all of them may be suitably connected to receive pressure from the branch conduits 6 and 7.

The thermostat 1 illustrated in detail in Fig. 3 and diagrammatically in Fig. 2 may comprise the usual cylindrical temperature-responsive element 11, having a push rod 12 associated therewith. The thermostat is provided with a base 13 on which is supported a valve post 14, having a bell crank lever 15 mounted thereon by means of a spring 16, which latter provides a fulcrum for the lever. The base 13 is provided with a small chamber 17 which provides communication between the winter control branch conduit 7 and the conduit 10 leading to the radiator valve 4. A restriction valve comprising a screw 17a is threaded into the chamber 17 for the purpose of restricting the inlet of the branch conduit 7. The bell crank lever 15 is arranged to control a vent 18, which latter communicates with the chamber 17 between the winter conduit 7 and the radiator valve conduit 10, and it will be apparent that when the vent 18 is completely open the pressure in the conduits 7 and 10 will not be sufficient to operate the radiator valve. The thermostat operates to control the vent in response to a predetermined variation in temperature, and the radiator valve will therefore be controlled in accordance with the variation of room temperature.

The summer control branch conduit 6 communicates with the thermostat chamber 11a in the cylinder 11, and when high outdoor temperatures prevail, the four way valve 8 will automatically be positioned as shown to admit pressure into the chamber 11a. The vent 18 will then provide a channel for admitting pressure to the radiator valve controlling conduit 10 in accordance with the setting of the thermostat and variations in room temperature. At this time the branch conduit 7 will be connected to the exhaust port 9 of the four way valve 8. However, as previously stated, this branch conduit 7 is restricted by a restriction valve 17a, and therefore sufficient pressure will be admitted to the valve conduit 10 to operate the radiator valve 4. When the outdoor temperature reaches a predetermined low degree, the four way valve 8 is automatically moved to the dotted line position for winter control, and the summer control conduit is connected to the exhaust port 9. Pressure may then be admitted to the radiator valve through the conduit 10 and controlled by the vent 18.

In other words, when pressure is directed through the winter control conduit 7, the thermostat acts merely to accumulate or vent the pressure directed to the radiator valve and when the pressure is directed through the summer control conduit 6 the thermostat acts as a control valve to direct pressure through the vent 18 to the radiator valve.

The automatic operation of the four way valve 8 is controlled by means of a so-called reverse acting outdoor thermostat 19, which may comprise the usual cylindrical temperature responsive element 20, having a pull rod 21 associated therewith for operating a valve lever 22 to control a vent 23 in accordance with predetermined outdoor temperatures. The pull rod 21 may be provided with an adjustable nut 24 for varying the effective range of the temperature control of the valve lever 22. The lever 22 is also controlled by means of a spring 25 normally tending to close the vent 23. The vent 23 is arranged to vent a conduit 26 to which air pressure is supplied from any suitable source through a restriction valve 27.

The conduit 26 communicates with a snap valve device 28 comprising a diaphragm or bellows 29, having downwardly extending spring members 30 thereon. The spring members are arranged to be moved by the contraction and expansion of the bellows 29 and engage a double cone shaped member 31, which latter forms an extension of a valve 32 for controlling a pressure inlet 33 and an exhaust opening 34 in the valve casing 35. The pressure inlet 33 may be supplied with air pressure from any suitable source and may also be provided with a suitable restriction valve.

The thermostat 19 may be arranged for effective operation over a comparatively narrow range, preferably not more than 3°; for instance from 55° to 52°; that is, when the outdoor temperature drops to 55°, the thermostat will start to close the vent 23, and when the temperature reaches 52° the vent will be completely closed, and the snap valve 28 will operate to close the exhaust valve 34 and admit pressure to a bellows 36 through a conduit 37. The bellows 36 is in turn arranged to operate a lever 38 pivoted at 39, and connected to an arm 40 on the valve 8 by means of a link 41, the parts normally being held in the position illustrated by means of a spring 42. It will therefore be apparent that when the outdoor temperature is at or above 55°, the vent 23 will be open and the snap valve 28 will be in the position illustrated, whereby the exhaust port 34 is open and the pressure inlet 33 is closed. The valve 8 will therefore be in the position illustrated to admit pressure to the summer control branch conduit 6 to control the radiator valve 4.

Also, when the outdoor temperature is at or below 52°, the vent 23 will be completely closed and pressure will be admitted to the bellows 29 of the snap valve 28 and the exhaust port 34 will then be closed. The pressure inlet 33 will be open to admit pressure to the bellows 36 and the four way valve 8 will be in the dotted line position and admit pressure to the winter control branch conduit 7 to control the heat exchanger valve 4.

When the four way valve 8 is in the position illustrated in full lines for summer control, it is desirable that a suitable cooling medium should be supplied to the radiators. Also when the four way valve moves to the winter control position, it is desirable to shut off the cooling medium and supply a suitable heating medium instead. This is automatically accomplished by means of suitable pressure controlled valves connected to the summer control branch conduit 6. During summer or when high outdoor temperatures prevail, a supply of suitable cooling medium is maintained in a container 43, and during the winter a similar supply of heating medium is maintained in a container 44. The temperature of the cooling medium in the container 43 may be regulated by means of any suitable refrigerant admitted to suitable coils therein by a pressure controlled valve 45, which valve may be in turn controlled by pressure admitted thereto through a suitable pressure conduit 46, the pressure in the conduit 46 being governed by means of a thermostat 47 arranged to open or close a vent 48 in accordance with temperature requirements within the container 43.

The temperature of the heating medium may be controlled in a similar manner by means of a thermostat 49 controlling a vent 50 in a pressure conduit 51 communicating with a valve 52, which latter controls a conduit 53 for governing a suitable heating device in the container 44.

The outlets of the containers 43 and 44 are each connected, as illustrated, to the conduit 3 arranged to deliver either the heating or cooling medium to the radiators in accordance with requirements. A circulating pump 54 may be provided in the circulating system. A return conduit 55 is connected from the radiators to the inlets of the containers as illustrated.

The outlet conduit of the cooling container is provided with a pressure operated valve 56, which is preferably of the so-called reverse type; that is when pressure is applied to a bellows 57, the valve will be open as illustrated, and when the pressure is relieved, the valve will be closed by means of a spring 58. The inlet to the cooling container is provided with a valve 59, which may be similar in all respects to the valve 56. This valve is also provided with a bellows 57a so that it is open when pressure is applied thereto, and will be closed by means of the spring 58a when the pressure is relieved.

The outlet and inlet conduits of the heating container are provided with valves 60 and 61 respectively, which are somewhat similar to valves 56 and 59. However, the valves 60 and 61 are of the so-called straight type, whereby when pressure is applied to the bellows 62 and 62a the valves will be closed, and when the pressure is relieved, the valves will be opened by means of springs 63 and 63a. The bellows 57 and 57a and 62 and 62a of the respective valves are all connected to the summer control conduit 6 by means of a suitable pressure conduit 64. It will, therefore, be apparent that when high outdoor temperatures prevail, and the valve 8 is in the position illustrated for summer control, pressure will be applied to all of the bellows through the conduit 64 leading thereto, and the valves 56 and 59 will be open whereby cooling medium may circulate through the radiator system. At this time, the valves 60 and 61 controlling the heating medium will be closed and no heating medium will be admitted. Also when low outdoor temperatures prevail, and the valve 8 is shifted to the dotted line position to apply pressure to the winter control branch conduit 7, and connect the branch conduit 6 and conduit 64 to the exhaust port 9, the pressure in the bellows of the respective valves will be relieved and the valves 56 and 57 controlling the cooling medium will immediately close, and the valves 60 and 61 controlling the heating medium will be open to permit circulation thereof.

As previously stated it is well known, that when extremely high outdoor temperatures prevail, it is desirable in order to prevent physical shock and discomfort in a cooled room, that the temperature in the room should vary in a predetermined relation with the variations in the outdoor temperature; that is, it is usually desirable that the room temperature should never be more than 10° or 15° below the outside temperature, and this approximate relationship should be maintained over a predetermined outdoor temperature range. An appropriate relationship may be maintained by raising the indoor temperature 1° for every 3° rise in outside temperature above 75°. Also when extremely low outside temperatures prevail it is desirable to vary the setting of the indoor thermostat in a predetermined relation with the variations in the low temperature in order to compensate for the heat loss from cold walls and windows, or for other reasons.

In order to cause the room thermostats to vary their setting and effectively control temperature relative to variations in high and low outdoor temperatures, a plurality of thermostats 65 and 66 are provided for controlling the air pressure in a conduit 67 leading to all the room thermostats as illustrated. The conduit 67 is arranged to receive air pressure through a restricted valve 68 from any suitable source. The thermostats 65 and 66 may be substantially identical in structure with the thermostat 19 previously described, the thermostat 65 being straight acting, and thermostat 66 being reverse acting; that is, thermostat 65 is arranged to open a vent with a decrease in temperature, while thermostat 66 opens its vent with an increase in temperature.

The thermostats 65 and 66 are adjusted to respond effectively to different temperatures, and thermostat 65 is provided with a substantially air tight chamber 69 with which the conduit 67 communicates through a vent 70. This vent 70 is controlled by a lever 71 pivoted at 72, and normally pressed outwardly to tend to open the vent 70 by means of a spring 73. The chamber 69 of the thermostat 65 is connected by means of a conduit 74 to a vent 75 in the thermostat 66. This vent is controlled by means of a lever 76 normally pressed inwardly by a spring 77 in a direction tending to close the vent. Both of these thermostats may be adjusted by means of suitable thumb nuts 78 in the same manner as the thermostat 19.

Referring to Fig. 3, the room thermostats 1 may be substantially identical in structure and operation. However, they may be adjusted to operate effectively at different temperatures and each may be provided with a bellows 79 mounted on the base and operatively engaging a lever 80 pivoted at 81 and normally retained under tension against the bellows by means of a spring 82. Adjustable stops 83 and 84 are provided to limit the movement of the lever in a predetermined range. These stops may be eccentrics mounted on suitable bolts or screws whereby they may be secured in adjusted position. A threaded screw 85 is mounted in the upper base 86 of the thermostat and engages the end of the push rod 12 so that rotating this screw 85 is equivalent to lengthening or shortening the push rod 12, thereby varying the setting of the thermostat. The screw 85 is provided with an arm 87 secured thereto and adjustably connected to the lever 80 by means of a link 88. A dial 89 is secured to the screw 85 in a manner to be rotated therewith, and is provided with an indicator or dial for indicating the setting of the thermostat. For instance, the thermostat may normally be set to start to open the vent 18 at 75°. However variations in the outdoor temperature will cause the combined operation of the thermostats 65 and 66 to control their associated vents so that pressure may be admitted to the bellows through the conduit 67 and thereby vary the effective operating temperature of the room thermostats, and the new setting will be indicated by the dial 89.

Each room thermostat will normally control its respective heat exchanger to maintain the room at the temperature to which the thermostat is manually adjusted, for example 75°. The outdoor thermostat 65 is for the purpose of varying the normal setting of the room thermostats when required during the summer when the outdoor temperature rises above 75°. For instance, the thermostat 65 may be adjusted to start to close its associated vent 70 at 75° and to complete the closing of the vent at 105°. Therefore, there will be a gradual increase in the setting of the indoor thermostat between the outdoor temperatures of 75° and 105°. As the temperature outside drops, the vent 70 will open and will remain completely open at all temperatures below 75°.

The thermostat 66, which is in air controlling series with thermostat 65, is a low temperature control to increase the setting of the room thermostats during winter when extremely low temperatures prevail, and the vent of thermostat 65 is open. For instance, the thermostat 66 may be adjusted to start to close at about 10° and be completely closed at −20°. Therefore, during summer, the thermostat 65 will be the master thermostat for controlling the setting of the room thermostats, while in winter the thermostat 66 operates as a master thermostat for the same purpose.

It will therefore be apparent that when extremely high outdoor temperatures prevail, the thermostat 65 will control the indoor thermostats to vary the setting in accordance with variations in outdoor temperature above a predetermined minimum, and the range of variation may be limited by means of the adjustable stops 83 and 84 for the lever 80. Also during the winter, when extremely cold outdoor temperatures prevail, the thermostat 66 becomes the master thermostat, and will vary the setting of the room thermostats at all points within a temperature range below a predetermined maximum.

It will be understood, of course, that in some installations it may be desirable to omit the outdoor thermostats 65 and 66, and the associated means for varying the setting of the thermostats 1. Also either one of the thermostats 65 and 66 may be omitted, and the other thermostat installed to vary the setting of the thermostats 1 in accordance with variations in either high or low outdoor temperatures as desired. The thermostat 19 and the associated pneumatic control for the winter and summer valve 8, may also be omitted in some installations, if desired, and the valve 8 may then be controlled manually or in any other suitable manner. If one or more of the above noted controls are omitted from the installation, the control of the heating and cooling mediums will be accomplished in the same manner as previously described, but only in accordance with variations in room temperature, and in accordance with the position of the winter and summer control valve 8.

The operation of the room thermostat is not changed with respect to temperature when the valve 8 is moved either manually or otherwise from summer control of a cooling medium to winter control of a heating medium, or vice versa. In any event the room thermostats always operate in the same manner with respect to temperature. The vent 18 always opens gradually in either winter or summer in response to a drop in temperature and closes in response to an increase in temperature. However in winter, when a heating medium is used, the pressure in conduit 10 is gradually increased as the vent closes to thereby open the radiator valve in response to a decrease in temperature, and in summer when a cooling medium is used the pressure is gradually increased as the vent opens in response to an increase in temperature to thereby open the radiator valve.

Figure 5:
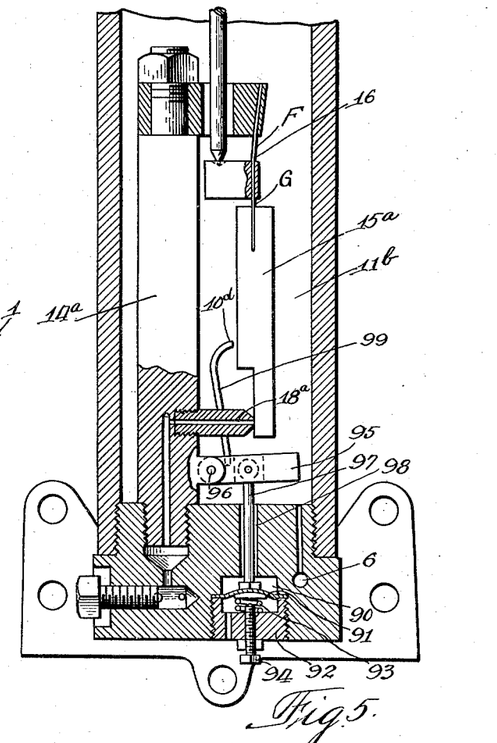
Fig. 5 is a fragmentary sectional view illustrating a slightly modified form of room thermostat adapted for use when it is desired to eliminate the outdoor variable control of the setting of the room thermostat.

When the thermostats 65 and 66 and associated parts used to vary the setting of the room thermostat are omitted, it is sometimes desirable to maintain the normal setting of the room thermostat during winter or low outdoor temperatures, and to increase this setting during summer control, or when high outdoor temperatures prevail. Fig. 5 illustrates an embodiment of the invention arranged to accomplish this result.

The thermostat illustrated in Fig. 5 is similar to the room thermostat previously described and illustrated in Fig. 3, and the pressure conduits are connected thereto in the same manner. However, the base of the thermostat is provided with a chamber 90 in which a flexible diaphragm 91 is secured by means of a threaded plug 92 having a suitable vent therethrough. A spring 93 is provided for normally maintaining the diaphragm in the raised position illustrated. An adjustable stop is arranged to limit the downward movement of the diaphragm and may comprise a screw or other adjustable member 94. A lever 95 is pivoted at 96 to the valve post 14a and is connected to the diaphragm 91 by means of a suitable link 97. The opening 98 through which the link 97 passes in the base is sufficiently large to permit air pressure in the thermostat chamber 11b to be applied to the diaphragm, and move the diaphragm downwardly against the limiting stop 94. The lever 95 is provided with an upwardly extending resilient spring finger 99 having its upper end 10d normally out of engagement with the valve lever 15a when the vent 18a is closed. However, when pressure is admitted to the chamber 11b of the thermostat for summer control, the diaphragm 91 will be forced downwardly against the end of the adjustable stop 94 and the spring 99 will then engage, and apply a predetermined yielding pressure, on the valve lever 15a and thereby tend to open the vent 18a, or to retain it open. The pressure to be applied may be predetermined by adjusting the diaphragm stop 94.

As previously stated the lever 15a is fulcrumed by the spring 16, the normal fulcrum being substantially at a point indicated by the reference character F. In the embodiment illustrated in Fig. 5, the lever 15a is also caused to partially fulcrum at the point indicated by the reference character G when pressure is applied within the thermostat chamber for summer control.

The operation of the thermostat is as follows: When the valve 8 is moved to a position for winter control, the conduit 6 leading to the thermostat chamber 11b is connected to the exhaust port 9, and therefore there is no appreciable pressure in the chamber and the mechanism just described performs no function as the spring 99 does not engage the lever 15a. When the valve 8 is in a position for summer control and pressure is admitted into the chamber 11b, the resilient spring finger 99 will apply a predetermined yielding pressure to the valve lever 15a and tend to open the vent 18a and to delay the closing thereof in response to high temperature. In this construction, while the limits of the vent opening-and-closing temperature range may relatively be substantially the same in either winter or summer, the range will automatically be raised in summer to cause effective operation at higher temperatures in accordance with the adjustment of the diaphragm limiting stop 94. In this embodiment the variation in setting of the thermostat is automatically controlled by moving the valve 8 from winter to summer control or vice versa, while in the embodiment previously described, the variation in room thermostat setting is controlled in accordance with variations in outdoor temperature.

Figure 6:
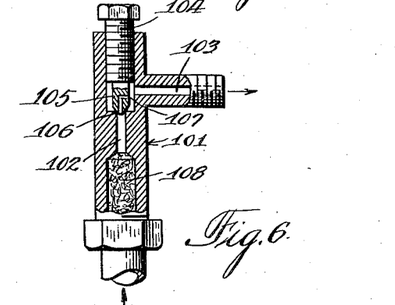
Fig. 6 is a sectional view through one of the air restriction valves illustrated in Fig. 1.

As previously stated, restriction valves such as 67 and 68 are provided for controlling the air flow in the pressure conduits. One of these valves is illustrated in Fig. 6 and may comprise a body portion 101 having an inlet 102 and an outlet 103. An adjustable valve member 104 is threaded into the body portion 101 and provided with a tapered reduced portion 105 arranged to engage a seat 106. It is desirable that a minimum passage be provided whereby the inlet 102 may always deliver a predetermined minimum air flow to the outlet 103 when the valve is closed. A restricted passage 107 is provided in the tapered portion 105. The size of the passage may be predetermined to provide constant minimum air flow when the tapered portion of the valve member 104 is snugly seated. The valve member 104 may, however, be adjusted to increase the flow if desired, and may be entirely removed for cleaning or repairing when desired. A suitable filter 108 may be provided in the inlet.

Figure 7:
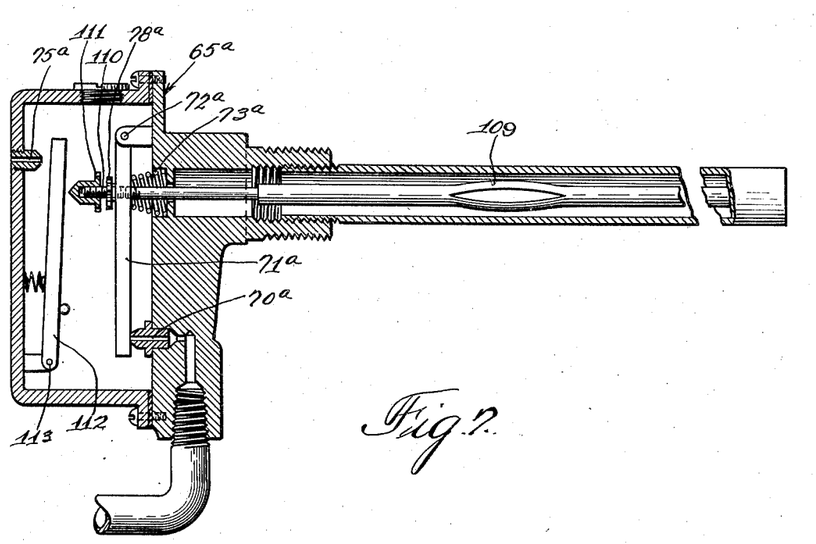
Fig. 7 is a sectional view of a single thermostat which may be substituted for the series thermostats illustrated in Fig. 1, for controlling the setting of the room thermostats.

Fig. 7 illustrates a single thermostat for controlling the pneumatic setting adjustment of the room thermostats. This single thermostat may be substituted for the thermostats 65 and 66 illustrated in Fig. 1. In this embodiment, the thermostat 65a may be substantially identical with the thermostat 65 previously described, with the addition of various elements for controlling the secondary vent 75a. In order to control this vent by means of the same thermostat mechanism which controls the vent 7a, the thermostatic push and pull rod 109 is threaded at 110 and provided with an adjusting nut 111 arranged to bear against a valve lever 112 pivoted at 113. It will be apparent that the temperature control of the lever 71a controlling the vent 70a may be adjusted by means of the adjusting nut 78a, whereby the vent 70a will be opened and closed at predetermined high temperatures. The vent 75a may also be controlled to open and close at predetermined low temperatures by adjustment of the nut 111, the position of which controls the movement of the valve lever 112. The vents 70a and 75a may thereby be controlled in substantially the same manner with respect to temperature as in the structure illustrated in Fig. 1 wherein the two thermostats 65 and 66 are used.

It will be apparent to those skilled in the art that various changes in detail may be made without departing from the spirit of the invention. It is therefore desired that the invention be limited only by the prior art and the scope of the appended claims.

Having thus described this invention, what is claimed and desired to be secured by Letters Patent is:

1. In a temperature control system, means for regulating the flow of heat exchanging medium, a thermostat for controlling said regulating means in response to room temperature, pneumatically controlled means to vary the setting of said thermostat and comprising a conduit for supplying pneumatic power, thermostatic mechanism effective above a predetermined high temperature and below a predetermined low temperature to vary the setting of said room thermostat, said mechanism comprising two leak ports in series for controlling the transmission of power in said conduit, and temperature responsive means for controlling said ports relative to predetermined high and low temperatures.

2. In a temperature control system, means for regulating the flow of heat exchanging medium, a thermostat for controlling said regulating means in response to room temperature, pneumatically controlled means to vary the setting of said thermostat and comprising a conduit for supplying pneumatic power, thermostatic mechanism effective above a predetermined high temperature and below a predetermined low temperature to vary the setting of said room thermostat, said mechanism comprising two leak ports in series for controlling the transmission of power in said conduit, and temperature responsive means for controlling one of said ports and maintaining the other port open when high outdoor temperatures prevail and reversing the control of said ports when low temperatures prevail.

3. A temperature control system comprising a pneumatically controlled regulating means for controlling the flow of heat exchanging medium to a heat exchanger, a summer conduit and a winter conduit for selectively transmitting pneumatic power to actuate said regulating means, means to select a desired conduit, a thermostatically controlled throttle valve mechanism for one selected conduit and arranged to vent the other selected conduit, and means controlled by the pneumatic power in one of said conduits to supply a cooling medium when the summer conduit is selected and a heating medium when the winter conduit is selected.

4. A temperature control system comprising a heat exchanger, pneumatically operable regulating means for controlling the flow of heat exchanging medium to said heat exchanger, a summer conduit and a winter conduit for selectively transmitting pneumatic power to actuate said regulating means, temperature controlled means for selecting a desired conduit in accordance with seasonal requirements, a throttle valve for one selected conduit and arranged to vent the other selected conduit, a non-reversing thermostat for operating said valve in accordance with room temperature requirements, temperature responsive means to vary the setting of said valve thermostat relative to predetermined temperature variations, and automatically controlled means to supply a cooling medium when said summer conduit is selected and a heating medium when said winter conduit is selected.

5. In a system of the class described, in combination, condition changing means, means for supplying medium to said condition changing means, pressure actuated regulator means for controlling the supply of said medium, a controller responsive to a condition which said condition changer is controlled in accordance with for controlling said regulator means, a first path for supplying fluid under pressure to said regulator means, said first path being connected to said controller in a manner to cause the pressure of said fluid to increase with increase in value of said condition, a second path for supplying fluid under pressure to said regulator means, said second path being connected to said controller in a manner to cause the pressure to be decreased upon increase in value of said condition, selective means for rendering only one path or the other operative to thereby reverse the action of said controller upon said regulator means, and means controlled by said selective means for changing the type of medium supplied to said condition changing means.

6. In a system of the class described, in combination, condition changing means, means for supplying medium to said condition changing means, pressure actuated regulator means for controlling the supply of said medium, a controller including a single valve device and a condition responsive device for actuating said single valve device, a first path for controlling the application of pressure fluid to said regulator means, said first path being connected to said valve device in a manner to cause the flow of medium to said condition changing means to be increased as the value of said condition increases, a second path for controlling the application of pressure fluid to said regulator means, said second path also being connected to said single valve device and in a manner to cause the flow of medium to said condition changing means to be increased as the value of said condition decreases, and selective means to render only one path or the other operative, to thereby reverse the action of said valve device on said regulator means.

7. The combination of regulating means for controlling the flow of conditioning medium, pressure responsive actuating means for actuating said regulating means, a first conduit and a second conduit for selectively directing fluid under pressure to said actuating means, a condition responsive valve means always operating in the same manner with respect to the condition to which it responds, means for directing said fluid to a desired conduit in accordance with control requirements, one of said conduits being arranged to direct said fluid directly through said valve means to said actuating means whereby the normal operation of said valve means provides a pressure controlling throttle in said conduit, the other conduit being arranged to direct power directly to said actuating means whereby the normal operation of said valve means provides a pressure relieving vent from said conduit.

8. The combination of regulating means for controlling the flow of heat exchanging medium, pneumatic means for actuating said regulating means, a winter conduit and a summer conduit for selectively directing pneumatic power to control said actuating means, a thermostatic valve means operating always in the same manner with respect to temperature, means for selecting a desired conduit in accordance with temperature control requirements, one of said conduits being arranged to direct power directly through said thermostatic valve means to said actuating means whereby the normal operation of said thermostatic valve means provides a pressure controlling throttle in said conduit, the other conduit being arranged to direct power directly to said actuating means whereby the normal operation of said thermostatic valve means provides a pressure relieving vent from said conduit, and means for varying the control point of said thermostatic valve means in a manner to maintain a higher temperature during the summer than during the winter.

9. The combination of regulating means for controlling the flow of heat exchanging medium, pneumatic means for actuating said regulating means, a winter conduit and a summer conduit for selectively directing pneumatic power to control said actuating means, a thermostatic valve means operating always in the same manner with respect to temperature, means for selecting a desired conduit in accordance with temperature control requirements, one of said conduits being arranged to direct power directly through said thermostatic valve means to said actuating means whereby the normal operation of said thermostatic valve means provides a pressure controlling throttle in said conduit, the other conduit being arranged to direct power directly to said actuating means whereby the normal operation of said thermostatic valve means provides a pressure relieving vent from said conduit, and means responsive to outdoor temperature for adjusting said thermostatic valve means in a manner to maintain a relatively low temperature when outside temperature is low, while raising the temperature maintained as outside temperature increases.

10. The combination of regulating means for controlling the flow of heat exchanging medium, pneumatic means for actuating said regulating means, a winter conduit and a summer conduit for selectively directing pneumatic power to control said actuating means, a thermostatic valve means operating always in the same manner with respect to temperature, means for selecting a desired conduit in accordance with temperature control requirements, one of said conduits being arranged to direct power directly through said thermostatic valve means to said actuating means whereby the normal operation of said thermostatic valve means provides a pressure controlling throttle in said conduit, the other conduit being arranged to direct power directly to said actuating means whereby the normal operation of said thermostatic valve means provides a pressure relieving vent from said conduit, and means controlled in accordance with the selection of said conduits for adjusting said thermostatic valve means in a manner to maintain a higher space temperature when the summer conduit is selected than when the winter conduit is selected.

11. In a system of the class described, in combination, condition changing means, means for supplying medium to said condition changing means, pressure actuated regulator means for controlling the supply of said medium, a controller responsive to a condition in accordance with which said condition changer is controlled for controlling said regulator means, a first path for supplying fluid under pressure to said regulator means, said first path being connected to said controller in a manner to cause the flow of medium to said condition changing means to be increased as the value of said condition increases, a second path for supplying fluid under pressure to said regulator means, said second path being connected to said controller in a manner to cause the flow of medium to said condition changing means to be increased upon decrease in value of said condition, selective means for rendering only one path or the other operative to thereby reverse the action of said controller upon said condition-changing means, and means controlled in accordance with the path selected for adjusting said controller in a manner to maintain a different standard of the condition being controlled by said condition changer when one of said paths is selected than when the other of said paths is selected.

12. In a heating and cooling system, in combination, heating means for heating a space, cooling means for cooling said space, a thermostat influenced by the temperature in said space for controlling both said heating means and said cooling means, a pressure actuated device for adjusting said thermostat, thermostatic means responsive to outside atmospheric temperature, and valve means for controlling the pressure applied to said pressure actuated device, said valve means being controlled by said thermostatic means in a manner to raise the control point of said thermostat when outside temperature either rises above a predetermined higher value or falls below a predetermined lower value.

13. In a heating and cooling system, in combination, heating means for heating a space, cooling means for cooling said space, a thermostat influenced by the temperature in said space for controlling both said heating means and said cooling means, a pressure actuated device for adjusting said thermostat, a plurality of thermostats influenced by outside atmospheric temperature, and means controlled by the cooperative action of said plurality of outside temperature influenced thermostats for controlling the pressure applied to said pressure actuated device for varying the control point of said space temperature influenced thermostat.

14. In a heating and cooling system, in combination, heating means for heating a space, cooling means for cooling said space, a thermostat influenced by the temperature in said space for controlling both said heating means and said cooling means, a pressure actuated device for adjusting said thermostat, a plurality of thermotats influenced by outside atmospheric temperature connected to said pressure actuated device, one of said outside temperature influenced thermostats acting to vary the pressure applied to said pressure actuated device in a manner to raise the control point of said space temperature influenced thermostat when outside temperature falls below a predetermined lower value and another of said outside temperature influenced thermostats acting to vary the pressure applied to said pressure actuated device in a manner to raise the control point of said space temperature influenced thermostat when outside temperature rises above a predetermined higher value.

15. In a summer-winter control system, in combination, heating and cooling means for heating or cooling a space, control means for said heating and cooling means comprising a single pressure actuated motor, said motor controlling heating medium in winter and controlling cooling medium in summer, a single valve device for controlling the supply and exhaust of air to said pressure actuated motor, an operating member for said valve device, said operating member being associated with said valve device at all times in a manner to cause movement of said operating member in one direction to have the same effect upon said valve device, a single thermostatic element responsive to space temperature for actuating said operating member in one direction or the other in response to changes in space temperature to thereby increase or decrease the pressure applied to said pressure actuated motor in accordance with variations in space temperature, reversing means for reversing the direction of change in pressure caused by a given change in temperature at said thermostatic element, adjusting means for adjusting the thermostatic element in a manner to vary the space temperature maintained, pressure actuated means for controlling said reversing means and said adjusting means, and means remote from said thermostatic element for controlling pressure applied to said pressure actuated means.

16. In a temperature control system, in combination, regulating means for controlling the flow of heat exchanging medium, a fluid pressure controlled motor for operating said regulating means, a thermostatic valve mechanism for controlling the application of fluid pressure to said motor, two paths for transmitting fluid pressure to said motor under the control of said thermostatic valve mechanism, said paths providing for reversing the control action of said thermostatic valve mechanism, a fluid pressure operated resilient means operating on said thermostatic valve mechanism for varying the control point thereof, and means operable from a remote point for varying the fluid pressure applied to said pressure operated resilient means.

JOHN M. LARSON.